United States Patent
Maeda

(10) Patent No.: US 7,072,015 B2
(45) Date of Patent: Jul. 4, 2006

(54) LIQUID CRYSTAL DISPLAY DEVICE AND ELECTRONIC DEVICE

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 10/699,539

(22) Filed: Nov. 3, 2003

(65) Prior Publication Data

US 2004/0135949 A1 Jul. 15, 2004

(30) Foreign Application Priority Data

Nov. 8, 2002 (JP) .................................. 2002-325238
Jul. 29, 2003 (JP) .................................. 2003-203099

(51) Int. Cl.
*G02F 1/1335* (2006.01)

(52) U.S. Cl. .................................. 349/120; 349/114
(58) Field of Classification Search ................. 349/114, 349/120

See application file for complete search history.

(56) References Cited

U.S. PATENT DOCUMENTS

| | | | | |
|---|---|---|---|---|
| 6,081,312 A | * | 6/2000 | Aminaka et al. | 349/120 |
| 6,141,075 A | * | 10/2000 | Ohmuro et al. | 349/120 |
| 6,281,956 B1 | * | 8/2001 | Ohmuro et al. | 349/120 |
| 6,356,325 B1 | * | 3/2002 | Shimoshikiryo | 349/120 |
| 6,628,359 B1 | * | 9/2003 | Terashita et al. | 349/120 |
| 6,642,981 B1 | * | 11/2003 | Ohmura et al. | 349/120 |
| 6,819,379 B1 | * | 11/2004 | Kubo et al. | 349/114 |
| 2001/0048496 A1 | * | 12/2001 | Baek | 349/114 |
| 2001/0055082 A1 | * | 12/2001 | Kubo et al. | 349/114 |

FOREIGN PATENT DOCUMENTS

| | | |
|---|---|---|
| JP | A 62-210423 | 9/1987 |
| JP | A 5-113561 | 5/1993 |
| JP | A 11-133413 | 5/1999 |
| JP | A 11-242226 | 9/1999 |
| JP | A 11-258605 | 9/1999 |
| JP | A 2001-109009 | 4/2001 |
| JP | A 2001-311948 | 11/2001 |
| JP | A 2002-55343 | 2/2002 |

\* cited by examiner

*Primary Examiner*—James A. Dudek
(74) *Attorney, Agent, or Firm*—Oliff & Berridge, PLC

(57) ABSTRACT

The present invention provides a high-contrast reflective display and transmissive display with a wide viewing angle in a transflective liquid crystal display device having reflective and transmissive structures. In such a display, each of dots can contain a reflective display region for reflective display and a transmissive display region for transmissive display. A liquid crystal layer can be composed of a nematic liquid crystal aligned substantially perpendicularly to substrates and having a negative dielectric anisotropy. A first retardation film having an optically negative uniaxiality, a second retardation film having an optically positive uniaxiality, and a first polarizer are arranged in that order outside an upper substrate, and a third retardation film having an optically negative uniaxiality, a fourth retardation film having an optically positive uniaxiality, a second polarizer, and illumination means are arranged in that order outside a lower substrate.

27 Claims, 8 Drawing Sheets

FIG. 7A

| TRANSMISSIVE LIQUID CRYSTAL LAYER Δnd(Rt)nm | 300 | 300 | 300 | 300 | 300 | 300 | 300 | 300 |
|---|---|---|---|---|---|---|---|---|
| SUM W1 OF RETARDATIONS IN Z-DIRECTION(nm) | 100 | 118 | 150 | 175 | 200 | 225 | 240 | 260 |
| W1/Rt | 0.33 | 0.39 | 0.50 | 0.58 | 0.67 | 0.75 | 0.80 | 0.87 |
| TRANSMISSIVE-DISPLAY VIEWING RANGE (CR>30)° | 21 | 25 | 35 | 50 | 41 | 35 | 26 | 19 |

FIG. 7B

| TRANSMISSIVE LIQUID CRYSTAL LAYER Δnd(Rt)nm | 500 | 500 | 500 | 500 | 500 | 500 | 500 | 500 |
|---|---|---|---|---|---|---|---|---|
| SUM W1 OF RETARDATIONS IN Z-DIRECTION(nm) | 150 | 190 | 250 | 300 | 335 | 375 | 400 | 450 |
| W1/Rt | 0.30 | 0.38 | 0.50 | 0.60 | 0.67 | 0.75 | 0.80 | 0.90 |
| TRANSMISSIVE-DISPLAY VIEWING RANGE (CR>30)° | 18 | 23 | 36 | 48 | 40 | 35 | 23 | 19 |

| TRANSMISSIVE LIQUID CRYSTAL LAYER Δnd(Rt)(nm) | 400 | 400 | 400 | 400 | 400 | 400 | 400 | 400 |
|---|---|---|---|---|---|---|---|---|
| SUM W2 OF RETARDATIONS IN Z-DIRECTION(nm) | 125 | 160 | 200 | 245 | 270 | 300 | 340 | 370 |
| W2/Rt | 0.31 | 0.40 | 0.50 | 0.61 | 0.68 | 0.75 | 0.85 | 0.93 |
| TRANSMISSIVE-DISPLAY VIEWING RANGE(CR>30)° | 21 | 24 | 36 | 52 | 43 | 36 | 25 | 20 |

FIG. 8

| TRANSMISSIVE LIQUID CRYSTAL LAYER Δnd(Rt)(nm) | 380 | 380 | 380 | 380 | 380 | 380 | 380 | 380 |
|---|---|---|---|---|---|---|---|---|
| SUM W3 OF RETARDATIONS IN Z-DIRECTION(nm) | 120 | 160 | 190 | 235 | 265 | 285 | 310 | 350 |
| W3/Rt | 0.32 | 0.42 | 0.50 | 0.62 | 0.70 | 0.75 | 0.82 | 0.92 |
| TRANSMISSIVE-DISPLAY VIEWING RANGE(CR>30)° | 18 | 23 | 37 | 51 | 44 | 36 | 27 | 19 |

FIG. 9

| REFLECTIVE LIQUID CRYSTAL LAYER Δnd(Rr)nm | 200 | 200 | 200 | 200 | 200 | 200 | 200 | 200 |
|---|---|---|---|---|---|---|---|---|
| SUM W4 OF RETARDATIONS IN Z-DIRECTION(nm) | 60 | 80 | 100 | 120 | 135 | 150 | 170 | 190 |
| W4/Rr | 0.30 | 0.40 | 0.50 | 0.60 | 0.68 | 0.75 | 0.85 | 0.95 |
| TRANSMISSIVE-DISPLAY VIEWING RANGE(CR>10)° | 15 | 22 | 32 | 45 | 42 | 33 | 23 | 14 |

FIG. 10

LIQUID CRYSTAL DISPLAY DEVICE AND ELECTRONIC DEVICE

BACKGROUND OF THE INVENTION

1. Field of Invention

The present invention relates to a liquid crystal display device and an electronic device. More particularly, the present invention relates to a technique for achieving high-contrast reflective and transmissive displays with a wide viewing angle in a transflective liquid crystal display device having reflective and transmissive structures.

2. Description of Related Art

Transflective liquid crystal display devices that adopt reflective and transmissive display modes can perform clear display with reduced power consumption even in a dark environment by switching between the reflective and transmissive display modes according to ambient brightness. As such a transflective liquid crystal display device, a liquid crystal display device has been proposed in which a liquid crystal layer is held between transmissive upper and lower substrates, a reflective film made of metal, such as aluminum, and having a light-transmitting aperture is provided on the inner side of the lower substrate, and the reflective film functions as a transflective film. In this case, in a reflective mode, external light incident from the upper substrate passes through the liquid crystal layer, is reflected by the reflective film disposed on the inner side of the lower substrate, passes through the liquid crystal layer again, and is emitted from the upper substrate for display. In a transmissive mode, light of a backlight incident from the lower substrate passes through the liquid crystal layer from the aperture of the reflective film, and is directed to the outside from the upper substrate for display. Therefore, a region of the reflective film where the aperture is formed serves as a transmissive display region, and a region of the reflective film where the aperture is not formed serves as a reflective display region. Such a display device is described, for example, in Japanese Unexamined Patent Application Publication No. 11-242226 (page 61, FIG. 1).

As another known art, a homeotropic liquid crystal display device has been proposed which improves the viewing-angle characteristic of liquid crystal, for example, in Japanese Unexamined Patent Application Publication No. 5-113561 (page 5, FIG. 1) see Patent 2).

SUMMARY OF THE INVENTION

In a known transflective liquid crystal display device that adopts reflective and transmissive display modes, the viewing angle is narrow in reflective and transmissive displays. In reflective display, a polarizer and a retardation film on the viewer side (upper side of the transflective liquid crystal device), and a liquid crystal layer in a reflective display region through which incident light passes twice must be designed. In transmissive display, a polarizer and a retardation film on the viewer side (upper side of the transflective liquid crystal device), a polarizer and a retardation film on the side of an illumination means (lower side of the transflective liquid crystal display device), and a liquid crystal layer in a transmissive display region through which incident from the illumination means passes once must be designed. For this reason, it is quite difficult to design high-contrast reflective and transmissive displays with a wide viewing angle.

In an electronic device equipped with the known transflective liquid crystal display device, the viewing angle is narrow, and a range in which display is visible is limited. Accordingly, an object of the present invention is to achieve high-contrast reflective display and transmissive display with a wide viewing angle in a transflective liquid crystal display device having reflective and transmissive structures. Another object of the present invention is to provide an electronic device equipped with a highly visible display device.

In order to overcome the above problems, the present invention can provide a liquid crystal display device including a liquid crystal layer held between a first substrate and a second substrate, in which each of dots contains a reflective display region for reflective display and a transmissive display region for transmissivedisplay. The liquid crystal layer is composed of a nematic liquid crystal aligned substantially perpendicularly to the substrates and having a negative dielectric anistropy. The device can further include a first retardation film having an optically negative uniaxiality, a second retardation film having an optically positive uniaxiality, and a first polarizer are arranged in that order outside the first substrate; and a third retardation film having an optically negative uniaxiality, a fourth retardation film having an optically positive uniaxiality, a second polarizer, and an illumination device are arranged in that order outside the second substrate.

In the above configuration, a high-contrast reflective display can be achieved by the first polarizer, the second retardation film having an optically positive uniaxiality, and the vertically aligned liquid crystal layer, and a high-contrast transmissive display can be achieved by the first polarizer, the second retardation film having an optically positive uniaxiality, the vertically aligned liquid crystal layer, the fourth retardation film having an optically positive uniaxiality, and the second polarizer. Furthermore, by interposing the first retardation film having an optically negative uniaxiality between the second retardation film having an optically positive uniaxiality and the liquid crystal layer, the viewing-angle characteristic of the vertically aligned liquid crystal layer when viewed from the oblique direction can be compensated for, and reflective display with a wide viewing angle can be achieved. By interposing the first retardation film having an optically negative uniaxiality between the second retardation film having an optically positive uniaxiality and the liquid crystal layer, and interposing the third retardation film having an optically negative uniaxiality between the fourth retardation film having an optically positive uniaxiality and the liquid crystal layer, the viewing-angle characteristic of the vertically aligned liquid crystal layer when viewed from the oblique direction can be compensated for, and transmissive display with a wide viewing angle can be achieved.

The present invention also provides a liquid crystal display device including a liquid crystal layer held between a first substrate and a second substrate, in which each of dots contains a reflective display region for reflective display and a transmissive display region for transmissivedisplay. The liquid crystal layer can be composed of a nematic liquid crystal aligned substantially perpendicularly to the substrates and having a negative dielectric anisotropy. The device can further include a first retardation film having an optically negative uniaxiality, a second retardation film having an optically positive uniaxiality, and a first polarizer are arranged in that order outside the first substrate, and a fourth retardation film having an optically positive uniaxiality, a second polarizer, and illumination means are arranged in that order outside the second substrate.

In the above configuration, a high-contrast reflective display can be achieved by the first polarizer, the second retardation film having an optically positive uniaxiality, and the vertically aligned liquid crystal layer, and a high-contrast transmissive display can be achieved by the first polarizer, the second retardation film having an optically positive uniaxiality, the vertically aligned liquid crystal layer, the fourth retardation film having an optically positive uniaxiality, and the second polarizer. Furthermore, by interposing the first retardation film having an optically negative uniaxiality between the second retardation film having an optically positive uniaxiality and the liquid crystal layer, the viewing-angle characteristic of the vertically aligned liquid crystal layer when viewed from the oblique direction can be compensated for, and reflective display with a wide viewing angle can be achieved. By interposing the first retardation film having an optically negative uniaxiality between the second retardation film having an optically positive uniaxiality and the liquid crystal layer, the viewing-angle characteristic of the vertically aligned liquid crystal layer when viewed from the oblique direction can be compensated for, and transmissive display with a wide viewing angle can be achieved.

The present invention can also provide a liquid crystal display device including a liquid crystal layer held between a first substrate and a second substrate, in which each of dots contains a reflective display region for reflective display and a transmissive display region for transmissive display. The liquid crystal layer can be composed of a nematic liquid crystal aligned substantially perpendicularly to the substrates and having a negative dielectricanisotropy. The device can further include a second retardation film having an optically positive uniaxiality, and a first polarizer are arranged in that order outside the firstsubstrate, and a third retardation film having an optically negative uniaxiality, a fourth retardation film having an optically positive uniaxiality, a second polarizer, and an illumination device are arranged in that order outside the second substrate.

In the above configuration, a high-contrast reflective display can be achieved by the first polarizer, the second retardation film having an optically positive uniaxiality, and the vertically aligned liquid crystal layer, and a high-contrast transmissive display can be achieved by the first polarizer, the second retardation film having an optically positive uniaxiality, the vertically aligned liquid crystal layer, the fourth retardation film having an optically positive uniaxiality, and the second polarizer. Furthermore, by interposing the third retardation film having an optically negative uniaxiality between the fourth retardation film having an optically positive uniaxiality and the liquid crystal layer, the viewing-angle characteristic of the vertically aligned liquid crystal layer when viewed from the oblique direction can be compensated for, and transmissive display with a wide viewing angle can be achieved.

In the liquid crystal display device of the present invention, the thickness of the liquid crystal layer can be smaller in the reflective display region than in the transmissive display region. This can achieve bright and high-contrast reflective and transmissive displays. In the transflective liquid crystal display device, for example, when d represents the thickness of the liquid crystal layer, $\Delta n$ represents the refractive index anisotropy of liquid crystal, and $\Delta nd$ represents the retardation of the liquid crystal expressed by the product of the thickness and the refractive index anisotropy, the retardation $\Delta nd$ of the liquid crystal in the reflective display region is expressed by $2 \times \Delta nd$ because incident light reaches the viewer after passing through the liquid crystal layer twice. The retardation $\Delta nd$ of the liquid crystal in the transmissive display region is expressed by $1 \times \Delta nd$ because light from the illumination device (backlight) passes through the liquid crystal layer only once. Since $\Delta nd$ can be optimized in both the reflective and transmissive display regions by setting the thickness of the liquid crystal layer smaller in the reflective display region than in the transmissive display region, bright and high-contrast reflective display and transmissive display can be achieved.

In the liquid crystal display device of the present invention, when nz1 and nz3 represent the refractive indices of the first retardation film and the third retardation film in the Z-axis direction serving as the thickness direction, nx1 and nx3 represent the refractive indices thereof in the X-axis direction serving as one direction in a plane perpendicular to the Z-axis direction, ny1 and ny3 represent the refractive indices thereof in the Y-axis direction perpendicular to the Z-axis and X-axis directions, and d1 and d3 represent the thicknesses thereof in the Z-axis direction, nx1≈ny1>nz1 and nx3≈ny3>nz3. The sum W1 of the retardation (nx1−nz1)×d1 of the first retardation film and the retardation (nx3−nz3)×d3 of the third retardation film has the following relationship with the retardation Rt of the liquid crystal layer in the transmissive display region:

$$0.5 \times Rt \leq W1 \leq 0.75 \times Rt.$$

In the liquid crystal display device of the present invention, when nz1 and nz3 represent the refractive indices of the first retardation film and the third retardation film in the Z-axis direction serving as the thickness direction, nx1 and nx3 represent the refractive indices thereof in the X-axis direction serving as one direction in a plane perpendicular to the Z-axis direction, ny1 and ny3 represent the refractive indices thereof in the Y-axis direction perpendicular to the Z-axis and X-axis directions, and d1 and d3 represent the thicknesses thereof in the Z-axis direction, nx1≈ny1>nz1 and nx3≈ny3>nz3. When nz2 and nz4 represent the refractive indices of the second retardation film and the fourth retardation film in the Z-axis direction serving as the thickness direction, nx2 and nx4 represent the refractive indices thereof in the X-axis direction serving as one direction in a plane perpendicular to the Z-axis direction, ny2 and ny4 represent the refractive indices thereof in the Y-axis direction perpendicular to the Z-axis and X-axis directions, and d2 and d4 represent the thicknesses thereof in the Z-axis direction, nx2>ny2≈nz2 and nx4>ny4≈nz4. The sum W1 of the retardation (nx1−nz1)×d1 of the first retardation film, the retardation (nx3−nz3)×d3 of the third retardation film, the retardation ((nx2+ny2)/2−nz2)×d2 of the second retardation film in the XY plane and in the Z-axis direction, and the retardation ((nx4+ny4)/2−nz4)×d4 of the fourth retardation film in the XY plane and in the Z-axis direction has the following relationship with the retardation Rt of the liquid crystal layer in the transmissive display region:

$$0.5 \times Rt \leq W1 \leq 0.75 \times Rt.$$

In this case, the viewing-angle characteristic of the vertically aligned liquid crystal layer when viewed from the oblique direction can be compensated for, and transmissive display with a wide viewing angle can be achieved. By setting the retardation (nx1−nz1)×d1 of the first retardation film and the retardation (nx3−nz3)×d3 of the third retardation film within the ranges of the present invention, the viewing-angle characteristic of the vertically aligned liquid crystal layer in the transmissive display region can be optically compensated for. Furthermore, by adding the retardation ((nx2+ny2)/2−nz2)×d2 of the second retardation film in the XY plane and in the Z-axis direction, and the retardation $((nx4+ny4)/2-nz4)\times d4$ of the fourth retardation film in the XY plane and in the Z-axis direction into the ranges of the present invention, the viewing-angle characteristic of the vertically aligned liquid crystal layer in the transmissive display region can be optically compensated for. The first retardation film and the third retardation film may be composed of a plurality of optically negative uniaxial films. The retardation Rt of the liquid crystal layer is expressed by the product $\Delta n \times d$ of the refractive index anisotropy $\Delta n$ of the liquid crystal and the thickness d of the liquid crystal layer.

In the liquid crystal display device of the present invention, when $nz1$ represents the refractive index of the first retardation film in the Z-axis direction serving as the thickness direction, $nx1$ represents the refractive index thereof in the X-axis direction serving as one direction in a plane perpendicular to the Z-axis direction, $ny1$ represents the refractive index thereof in the Y-axis direction perpendicular to the Z-axis and X-axis directions, and $d1$ represents the thickness thereof in the Z-axis, $nx1 \approx ny1 > nz1$. The retardation $(nx1-nz1)\times d1$ of the first retardation film has the following relationship with the retardation Rt of the liquid crystal layer in the transmissive display region:

$$0.5 \times Rt \leq (nx1-nz1)\times d1 \leq 0.75 \times Rt.$$

In the liquid crystal display device of the present invention, when $nz1$ represents the refractive index of the first retardation film in the Z-axis direction serving as the thickness direction, $nx1$ represents the refractive index thereof in the X-axis direction serving as one direction in a plane perpendicular to the Z-axis direction, $ny1$ represents the refractive index thereof in the Y-axis direction perpendicular to the Z-axis and X-axis directions, and $d1$ represents the thickness thereof in the Z-axis direction, $nx1 \approx ny1 > nz1$. When $nz2$ and $nz4$ represent the refractive indices of the second retardation film and the fourth retardation film in the Z-axis direction serving as the thickness direction, $nx2$ and $nx4$ represent the refractive indices thereof in the X-axis direction serving as one direction in a plane perpendicular to the Z-axis direction, $ny2$ and $ny4$ represent the refractive indices thereof in the Y-axis direction perpendicular to the Z-axis and X-axis directions, and $d2$ and $d4$ represent the thicknesses thereof in the Z-axis direction, $nx2>ny2\approx nz2$ and $nx4>ny4\approx nz4$. The sum W2 of the retardation $(nx1-nz1)\times d1$ of the first retardation film, the retardation $((nx2+ny2)/2-nz2)\times d2$ of the second retardation film in the XY plane and in the Z-axis direction, and the retardation $((nx4+ny4)/2-nz4)\times d4$ of the fourth retardation film in the XY plane and in the Z-axis direction has the following relationship with the retardation Rt of the liquid crystal layer in the transmissive display region:

$$0.5 \times Rt \leq W2 \leq 0.75 \times Rt.$$

In this case, the viewing-angle characteristic of the vertically aligned liquid crystal layer when viewed from the oblique direction can be compensated for, and transmissive display with a wide viewing angle can be achieved. By setting the retardation $(nx1-nz1)\times d1$ of the first retardation film within the range of the present invention, the viewing-angle characteristic of the vertically aligned liquid crystal layer in the transmissive display region can be optically compensated for. Furthermore, by setting the retardation $((nx2+ny2)/2-nz2)\times d2$ of the second retardation film in the XY plane and in the Z-axis direction, and the retardation $((nx4+ny4)/2-nz4)\times d4$ of the fourth retardation film in the XY plane and in the Z-axis direction within the ranges of the present invention, the viewing-angle characteristic of the vertically aligned liquid crystal layer in the transmissive display region can be optically compensated for. The first retardation film may be composed of a plurality of optically negative uniaxial films.

In the liquid crystal display device of the present invention, when $nz3$ represents the refractive index of the third retardation film in the Z-axis direction serving as the thickness direction, $nx3$ represents the refractive index thereof in the X-axis direction serving as one direction in a plane perpendicular to the Z-axis direction, $ny3$ represents the refractive index thereof in the Y-axis direction perpendicular to the Z-axis and X-axis directions, and $d3$ represents the thickness thereof in the Z-axis direction, $nx3 \approx ny3 > nz3$. The retardation $(nx3-nz3)\times d3$ of the third retardation film has the following relationship with the retardation Rt of the liquid crystal layer in the transmissive display region:

$$0.5 \times Rt \leq (nx3-nz3)\times d3 \leq 0.75 \times Rt.$$

In the liquid crystal display device of the present invention, when $nz3$ represents the refractive index of the third retardation film in the Z-axis direction serving as the thickness direction, $nx3$ represents the refractive index thereof in the X-axis direction serving as one direction in a plane perpendicular to the Z-axis direction, $ny3$ represents the refractive index thereof in the Y-axis direction perpendicular to the Z-axis and X-axis directions, and $d3$ represents the thickness thereof in the Z-axis direction, $nx3 \approx ny3 > nz3$. When $nz2$ and $nz4$ represent the refractive indices of the second retardation film and the fourth retardation film in the Z-axis direction serving as the thickness direction, $nx2$ and $nx4$ represent the refractive indices thereof in the X-axis direction serving as one direction in a plane perpendicular to the Z-axis direction, $ny2$ and $ny4$ represent the refractive indices thereof in the Y-axis direction perpendicular to the Z-axis and X-axis directions, and $d2$ and $d4$ represent the thicknesses thereof in the Z-axis direction, $nx2>ny2\approx nz2$ and $nx4>ny4\approx nz4$. The sum W3 of the retardation $(nx1-nz1)\times d1$ of the first retardation film, the retardation $(nx3-nz3)\times d3$ of the third retardation film, the retardation $((nx2+ny2)/2-nz2)\times d2$ of the second retardation film in the XY plane and in the Z-axis direction, and the retardation $((nx4+ny4)/2-nz4)\times d4$ of the fourth retardation film in the XY plane and in the Z-axis direction has the following relationship with the retardation Rt of the liquid crystal layer in the transmissive display region:

$$0.5 \times Rt \leq W3 \leq 0.75 \times Rt.$$

In this case, the viewing-angle characteristic of the vertically aligned liquid crystal layer when viewed from the oblique direction can be compensated for, and transmissive display with a wide viewing angle can be achieved. By setting the retardation $(nx3-nz3)\times d3$ of the third retardation film within the range of the present invention, the viewing-angle characteristic of the vertically aligned liquid crystal layer in the transmissive display region can be optically compensated for. Furthermore, by adding the retardation $((nx2+ny2)/2-nz2)\times d2$ of the second retardation film in the XY plane and in the Z-axis direction, and the retardation $((nx4+ny4)/2-nz4)\times d4$ of the fourth retardation film in the XY plane and in the Z-axis direction into the ranges of the present invention, the viewing-angle characteristic of the vertically aligned liquid crystal layer in the transmissive display region can be optically compensated for. The third retardation film may be composed of a plurality of optically negative uniaxial films.

In the liquid crystal display device of the present invention, when nx2 and nx4 represent the refractive indices of the second retardation film and the fourth retardation film in the X-axis direction serving as one direction in a plane perpendicular to the thickness direction (Z-axis), ny2 and ny4 (nx2>ny2 and nx4>ny4) represent the refractive indices thereof in the Y-axis direction perpendicular to the Z-axis and X-axis directions, and d2 and d4 represent the thicknesses thereof in the Z-axis direction, the X-axis of the second retardation film and the X-axis of the fourth retardation film are orthogonal to each other, and the following condition is satisfied:

$$(nx2-ny2) \times d2 = (nx4-ny4) \times d4.$$

In this case, the retardations of the second and fourth retardation films in the panel surface (XY plane) of the liquid crystal display device can be cancelled each other, and it is possible to achieve the best possible black display (in the case that the polarization axis of the first polarizer and the polarization axis of the second polarizer are orthogonal) and the best possible white display (in the case that the polarization axis of the first polarizer and the polarization axis of the second polarizer are parallel) with the first polarizer and the second polarizer.

In the liquid crystal display device of the present invention, the second retardation film and the fourth retardation film satisfy the following condition:

$$100 \text{ nm} \leq (nx2-ny2) \times d2 = (nx4-ny4) \times d4 \leq 160 \text{ nm}$$

In this case, the first polarizer and the second retardation film can produce circularly or elliptically polarized light with small wavelength dispersion, and the second polarizer and the fourth retardation film can produce circularly or elliptically polarized light with small wavelength dispersion. This makes it possible to switch the liquid crystal display device by using circularly or elliptically polarized light, and to achieve high-contrast reflective display and transmissive display.

In the liquid crystal display device of the present invention, the second retardation film can be composed of two or more oriented films for converting linearly polarized light incident from the first polarizer into circularly polarized light in a broad band, and the fourth retardation film is composed of two or more oriented films for converting linearly polarized light incident from the second polarizer into circularly polarized light in a broad band. In this case, since light with almost all the wavelengths in the visible region can be converted into ideal circularly polarized light, it is possible to achieve high-contrast reflective display and transmissive display without producing unnecessary color. For example, a broadband circularly polarization plate can be obtained by stacking a half-wave plate and a quarter-wave plate at an appropriate angle (formed by the direction of orientation).

In the liquid crystal display device of the present invention, the second retardation film can be composed of two or more oriented films for converting linearly polarized light incident from the first polarizer into circularly polarized light in a broad band. In this case, since light with almost all the wavelengths in the visible region can be converted into ideal circularly polarized light, it is possible to achieve high-contrast reflective display without producing unnecessary color. For example, a broadband circularly polarization plate can be obtained by stacking a half-wave plate and a quarter-wave plate at an appropriate angle (formed by the direction of orientation).

In the liquid crystal display device of the present invention, the fourth retardation film can be composed of two or more oriented films for converting linearly polarized light incident from the second polarizer into circularly polarized light in a broad band. In this case, since light with almost all the wavelengths in the visible region can be converted into ideal circularly polarized light, it is possible to achieve high-contrast transmissive display without producing unnecessary color. For example, a broadband circularly polarization plate can be obtained by stacking a half-wave plate and a quarter-wave plate at an appropriate angle (formed by the direction of orientation).

In the liquid crystal display device of the present invention, in the second retardation film and the fourth retardation film, the ratio R(450)/R(590) of an in-plane retardation R(450) for 450 nm and an in-plane retardation R(590) for 590 nm is less than 1. In this case, since broadband circularly polarized light can be produced by the combination with the first polarizer or the second polarizer, it is possible to achieve high-contrast reflective display and transmissive display without producing unnecessary color.

In the liquid crystal display device of the present invention, the polarization axis of the first polarizer and the polarization axis of the second polarizer can be orthogonal to each other. In this case, the best possible black display can be performed with the first polarizer and the second polarizer. Therefore, a high-contrast transmissive display is possible.

In the liquid crystal display device of the present invention, the retardation $(nx1-nz1) \times d1$ of the first retardation film can be substantially equal to the retardation $(nx3-nz3) \times d3$ of the third retardation film. In this case, the viewing angle in the reflective display region in viewing the liquid crystal layer from the oblique direction can be compensated for by the first retardation film having an optically negative uniaxiality, and the viewing angle in the transmissive display region in viewing the liquid crystal layer from the oblique direction can be compensated for by the first and third retardation films having an optically negative uniaxiality. Since light passes through the liquid crystal layer twice in the reflective display region and passes therethrough only once in the transmissive display region, the thickness of the liquid crystal layer in the transmissive display region is substantially double the thickness in the reflective display region. For this reason, it is necessary to set the retardation of the first retardation film substantially equal to the retardation of the third retardation film.

In the liquid crystal display device of the present invention, when nz1 represents the refractive index of the first retardation film in the Z-axis direction serving as the thickness direction, nx1 represents the refractive index thereof in the X-axis direction serving as one direction in a plane perpendicular to the Z-axis direction, ny1 represents the refractive index thereof in the Y-axis direction perpendicular to the Z-axis and X-axis directions, and d1 represents the thickness thereof in the Z-axis direction, $nx1 \approx ny1 > nz1$. The retardation $(nx1-nz1) \times d1$ of the first retardation film has the following relationship with the retardation Rr of the liquid crystal layer in the reflective display region:

$$0.5 \times Rr \leq (nx1-nz1) \times d1 \leq 0.75 \times Rr$$

In the liquid crystal display device of the present invention, when nz1 represents the refractive index of the first retardation film in the Z-axis direction serving as the thickness direction, nx1 represents the refractive index thereof in the X-axis direction serving as one direction in a plane perpendicular to the Z-axis direction, ny1 represents the refractive index thereof in the Y-axis direction perpendicular to the Z-axis and X-axis directions, and d1 represents the thickness thereof in the Z-axis direction, $nx1 \approx ny1 > nz1$. When nz2 represents the refractive index of the second retardation film in the Z-axis direction serving as the thickness direction, nx2 represents the refractive index thereof in the X-axis direction serving as one direction in a plane perpendicular to the Z-axis direction, ny2 represents the refractive index thereof in the Y-axis direction perpendicular to the Z-axis and X-axis directions, and d2 represents the thickness thereof in the Z-axis direction, $nx2 > ny2 \approx nz2$. The sum W4 of the retardation $(nx1-nz1) \times d1$ of the first retardation film, and the retardation $((nx2+ny2)/2-nz2) \times d2$ of the second retardation film in the XY plane and in the Z-axis direction has the following relationship with the retardation Rr of the liquid crystal layer in the reflective display region:

$$0.5 \times Rr \leq W4 \leq 0.75 \times Rr.$$

In this case, the viewing angle of the liquid crystal layer in the reflective display region when viewed from the oblique direction can be compensated for by the first retardation film having an optically negative uniaxiality. By adding the second retardation film having an optically positive uniaxiality, the viewing angle of the liquid crystal layer in the reflective display region when viewed from the oblique direction can be compensated for.

In the liquid crystal display device of the present invention, a reflective layer is provided in the reflective display region to reflect incident light. Since external light can be reflected by the reflective layer, reflective display is possible.

In the liquid crystal display device of the present invention, the reflective layer has irregularities to scatter and reflect incident light. In this case, since incident light is scattered and reflected by the reflective layer having irregularities, reflective display can be viewed with a wide viewing angle.

In the liquid crystal display device of the present invention, the X-axis directions of the second retardation film and the fourth retardation film can be orthogonal to each other, and the X-axis directions of the second retardation film and the fourth retardation film form an angle of approximately 45°, respectively, with the polarization axis of the first polarizer and the polarization axis of the second polarizer.

In this case, the retardations of the second and fourth retardation films in the panel surface (XY plane) of the liquid crystal display device can be cancelled each other, and it is possible to perform the best possible black display with the first polarizer and the second polarizer. Moreover, the first polarizer and the second retardation film, and the second polarizer and the fourth retardation film can produce circularly polarized light. This makes it possible to switch the liquid crystal display device with circularly polarized light, and to achieve bright and high-contrast reflective display and transmissive display.

In the liquid crystal display device of the present invention, an electrode having an aperture can be provided on an inner surface, adjacent to the liquid crystal layer, of at least one of the first substrate and the second substrate so as to drive the liquid crystal. In this case, since an oblique electric field is produced in the liquid crystal layer by the aperture of the electrode for driving the liquid crystal, a plurality of director directions of liquid crystal molecules can be produced in one dot during voltage application. This can achieve a transflective liquid crystal display device with a wide viewing angle.

In the liquid crystal display device of the present invention, projections can be provided on an electrode disposed on an inner surface of at least one of the first substrate and the second substrate adjacent to the liquid crystal layer. In this case, since the tilting direction of liquid crystal molecules can be controlled by the projections provided on the electrode, a plurality of director directions of the liquid crystal molecules can be produced in one dot during voltage application. This can achieve a transflective liquid crystal display device with a wide viewing angle.

In the liquid crystal display device of the present invention, one dot contains at least two directors of the liquid crystal when the liquid crystal is driven by the electrode. This can achieve a transflective liquid crystal display device with a wide viewing angle.

An electronic device of the present invention can include the above-described transflective liquid crystal display device. This can achieve an electronic device equipped with a highly visible display device.

BRIEF DESCRIPTION OF THE DRAWINGS

The invention will be described with reference to the accompanying drawings, wherein like numerals reference like elements, and wherein:

FIG. 7 is a table showing the relationship between W1/Rt and a transmissive-display viewing range in the liquid crystal display device according to the first embodiment of the present invention;

FIG. 8 is a table showing the relationship between W2/Rt and a transmissive-display viewing range in the liquid crystal display device according to the second embodiment of the present invention;

FIG. 9 is a table showing the relationship between W3/Rt and a transmissive-display viewing range in the liquid crystal display device according to the third embodiment of the present invention;

FIG. 10 is a table showing the relationship between W4/Rr and a reflective-display viewing range in the liquid crystal display device of the present invention;

DETAILED DESCRIPTION OF PREFERRED EMBODIMENTS

Embodiments of the present invention will be described below with reference to the drawings.

Figure 1:
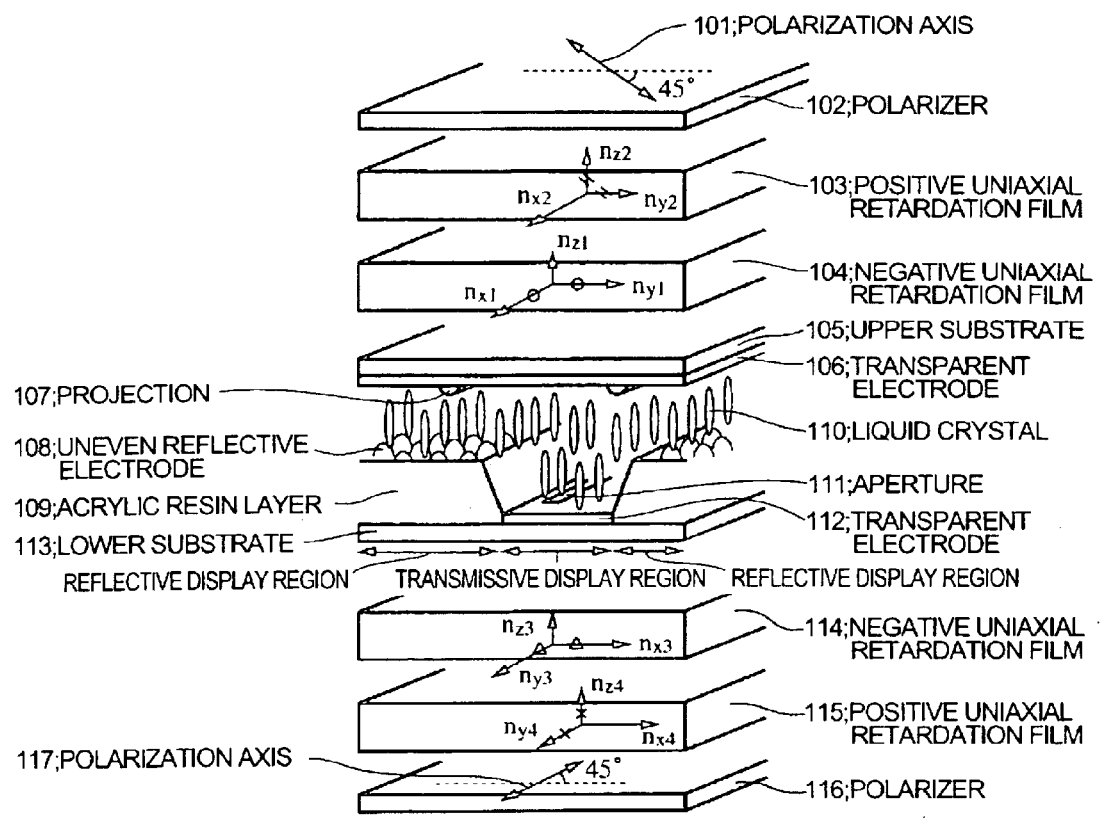
FIG. 1 is a schematic view showing a partial cross-sectional configuration of a liquid crystal display device according to a first embodiment of the present invention.

FIG. 1 shows a first embodiment in which a configuration of the present invention is applied to an active-matrix liquid crystal display device. A liquid crystal display device of the first embodiment has a basic configuration in which a liquid crystal layer 110 is held between upper and lower substrates 105 and 113 opposing each other and made of a transparent glass or the like, as shown by a cross-sectional configuration in FIG. 1. Although not shown, a sealing material is, in actuality, disposed on the peripheries of the substrates 105 and 13, and the liquid crystal layer 110 is surrounded by the substrates 105 and 113 and the sealing material to be sealed and held between the substrates 105 and 113. While a backlight including a light source, a light guide plate, and so on is provided below the lower substrate 113, it is not shown in FIG. 1.

Retardation films 104 and 103 and a polarizer 102 are arranged on an upper side (viewer side) of the upper substrate 105, and retardation films 114 and 115 and a polarizer 116 are arranged on a lower side of the lower substrate 113. The polarizers 102 and 116 transmit only linearly polarized light polarized in one direction, of external light incident from the upper side and light of the backlight incident from the lower side, and the retardation films 103 and 15 convert linearly polarized light transmitted through the polarizers 102 and 116 into circularly polarized light (including elliptically polarized light). Therefore, the polarizers 102 and 16 and the retardation films 103 and 115 function as circularly-polarized-light introducing devices. In this embodiment, one side on which the backlight is provided is designated as a lower side, and the other side from which external light enters is designated as an upper side. The substrate 105 and the substrate 113 are also referred, respectively, to an upper substrate and a lower substrate.

A transparent electrode 106 made of ITO (Indium Tin Oxide) or the like can be provided on a side of the upper substrate 105 adjacent to the liquid crystal layer 110, and a vertical alignment film (not shown) is provided on a side of the transparent electrode 106 adjacent to the liquid crystal layer 110 so as to cover the transparent electrode 106. A reflective electrode 108 also functioning as a reflecting layer, and a transparent electrode 112 are provided on a side of the lower substrate 113 adjacent to the liquid crystal layer 110. The reflective electrode 108 functions as a reflective display region, and the transparent electrode 112 functions as a transmissive display region. The reflective electrode 108 is made of a reflective, that is, high-reflectance metal material, such as Al or Ag, and is shaped like a rectangular frame in plan view. A vertical alignment film (not shown) is provided on a side of the reflective electrode 108 adjacent to the liquid crystal layer 110.

A liquid-crystal-layer thickness control layer 109 made of resin, such as acrylic resin, enables the reflective electrode 108 to have an uneven shape, and makes the thickness of the liquid crystal layer 110 smaller in the reflective display region than in the transmissive display region. Such a structure can be formed by a photolithographic process. While the reflecting layer in the reflective display region also functions as a liquid-crystal driving electrode, a liquid-crystal driving electrode may be provided separately. By conducting a photolithographic process in which a resist is applied on a glass substrate serving as the lower substrate 113, etching is performed with fluorinated acid, and the resist is stripped after etching, fine irregularities may be formed, and a reflective layer may be formed thereon to obtain an uneven reflective layer.

Dielectric projections 107 made of acrylic resin are provided on the transparent electrode 106 on the inner side of the upper substrate 105 so as to apply an oblique electric field, which is not orthogonal to the surfaces of the substrates 105 and 113, to the liquid crystal layer 110 in cooperation with an aperture 111 of the transparent electrode 112 provided on the inner side of the lower substrate 113. The dielectric projections 107 and the aperture 111 of the transparent electrode 112 allow a plurality of directors of the liquid crystal layer 110 to be produced in one dot by applying a voltage to the electrodes 106, 108, and 112, and this achieves a liquid crystal display device that does not depend on the viewing angle.

Although not shown in FIG. 1, at the peripheral corner of each dot, a thin-film transistor serving as a switching element for driving the electrodes 108 and 112 can be provided and a gate line and a source line are also provided to feed electricity to the thin-film transistor. Instead of the thin-film transistor, a two-terminal linear element or other switching elements may be adopted as the switching element.

Operational advantages of the transflective liquid crystal display device having the configuration shown in FIG. 1 will now be described. In order to perform reflective display, light incident from the outside of the device is used, and the incident light is guided to the liquid crystal layer 110 through the polarizer 102, the retardation films 103 and 104, the upper substrate 105, and the electrode 106.

In the reflective display region, after the incident light passes through the liquid crystal layer 110, it is reflected by the reflective electrode 108. The reflected light passes again through the liquid crystal layer 110, is returned to the outside of the device through the electrode 106, the upper substrate 105, the retardation films 104 and 103, and the polarizer 102, and reaches a viewer to perform reflective display. In such reflective display, the polarization state of the light passing through the liquid crystal layer 110 is changed by controlling the alignment of liquid crystal in the liquid crystal layer 110 by the electrodes 106 and 108, thereby producing light and dark displays.

In order to perform transmissive display, light emitted from the backlight (illumination means) enters through the polarizer 116, the retardation films 115 and 114, and the substrate 113. In this case, in the transmissive display region, the light incident from the substrate 113 passes through the electrode 112, the liquid crystal layer 110, the electrode 106, the substrate 105, the retardation films 104 and 103, and the polarizer 102 in that order in order to perform transmissive display. In such transmissive display, the polarization state of light passing through the liquid crystal layer 110 can be changed to perform light and dark displays by controlling the alignment of liquid crystal in the liquid crystal layer 110 by the electrodes 106 and 112.

In the reflective display mode of these display modes, incident light passes through the liquid crystal layer 110 twice. In the transmissive display mode, light emitted from the backlight (illumination means) passes through the liquid crystal layer 110 only once. The retardation of the liquid crystal layer 110 will now be considered. In a case in which alignment control is exerted by applying the same voltage from the electrodes in a reflective display mode and a transmissive display mode, the retardation of liquid crystal differs, and the transmittance of liquid crystal is thereby changed. However, in this embodiment, a liquid-crystal-layer thickness control layer 109 made of acrylic resin can be provided in a region where reflective display is performed, that is, in a reflective display region having the reflective electrode 108 shown in FIG. 1. Therefore, the thickness of the liquid crystal layer 110 is larger in a transmissive display region where transmissive display is performed than in the reflective display region, and the states of the liquid crystal layer 110 concerning the transmissive display and the reflective display in the reflective display region and the transmissive display region, that is, the distances by which light passes through the liquid crystal layer 110 in the regions can be optimized. Consequently, the liquid-crystal-layer thickness control layer 109 made of acrylic resin allows the retardation to be optimized in the reflective display region and the transmissive display region, and permits bright and high-contrast reflective display and transmissive display.

The retardation film 103 exhibits a positive uniaxiality ($nx2 > ny2 \approx nz2$), and the retardation in the XY plane is approximately 140 nm. The X-axis of the retardation film 103 is at an angle of approximately 45° to a polarization axis 101 of the polarizer 102. The retardation film 115 exhibits a positive uniaxiality ($nx4 > ny4 \approx nz4$), and the retardation in the XY plane is approximately 140 nm. The X-axis of the retardation film 115 is at an angle of approximately 45° to a polarization axis 117 of the polarizer 116. The polarization axis 101 of the polarizer 102 and the polarization axis 117 of the polarizer 116 are orthogonal to each other, and the X-axis of the retardation film 103 and the X-axis of the retardation film 115 are similarly orthogonal to each other. Since the phase difference between the polarizers 102 and 116 can be made zero during non-driving time by setting the retardation of the retardation film 103 equal to the retardation of the retardation film 115, an ideal black display can be achieved.

The retardation film 104 exhibits a negative uniaxiality ($nx1 \approx ny1 > nz1$), and has a retardation of approximately 0 in the XY plane and a retardation of approximately 120 nm in the Z-axis direction. The retardation film 114 exhibits a negative uniaxiality ($nx3 \approx ny3 > nz3$), and has a retardation of approximately 0 in the XY plane and a retardation of approximately 120 nm in the Z-axis direction. The liquid crystal layer 110 provides a retardation of 380 nm in the transmissive display region and a retardation of 200 nm in the reflective display region. By placing the retardation films 104 and 114, the phase difference of the liquid crystal layer 110 made when viewed from the oblique direction can be compensated for.

Figure 12:
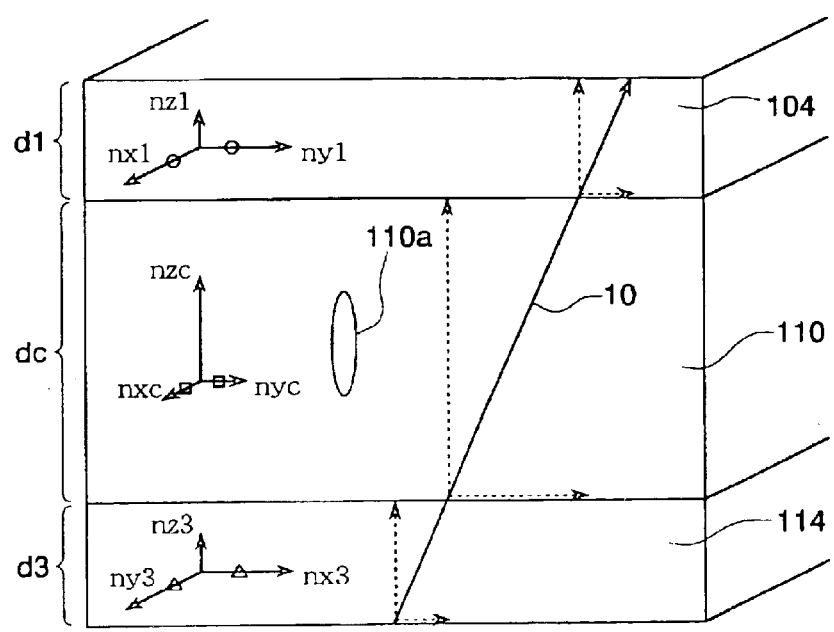
FIG. 12 is an explanatory view showing an action of compensation for a viewing-angle characteristic.

FIG. 12 is an explanatory view showing the action of compensation for the viewing-angle characteristic. Light 10 obliquely emitted from the backlight (not shown) reaches a viewer (not shown) through the third retardation film 114, the liquid crystal layer 110, and the first retardation film 104. Since liquid crystal molecules 110a are vertically aligned in the liquid crystal layer 110, the retardation in the XY plane of the liquid crystal layer 110 is approximately 0. The retardations in the XY plane of the first retardation film 104 and the third retardation film 114 are also approximately 0. Therefore, the light 10 does not produce a phase difference in the vertical direction. However, when light obliquely enters, a phase difference is produced in the Z-axis direction. Accordingly, a phase difference produced in the liquid crystal layer 110 when obliquely viewed can be compensated for by placing the retardation films 104 and 114.

FIG. 7 shows the relationship between W1/Rt and the transmissive-display viewing range. FIG. 7(a) shows a case in which the retardation Rt in a transmissive display region is 300 nm, and FIG. 7(b) shows a case in which the retardation Rt in the transmissive display region is 500 nm. The total retardation W1 in the Z-axis direction is the sum of the retardation ($nx1-nz1$)×d1 in the Z-axis direction of the first retardation film 104, the retardation ($nx3-nz3$)×d3 in the Z-axis direction of the third retardation film 114, the retardation (($nx2+ny2$)/2−$nz2$)×d2 in the Z-axis direction of the second retardation film 103, and the retardation (($nx4+ny4$)/2−$nz4$)×d4 in the Z-axis direction of the fourth retardation film 115. The transmissive-display viewing range means a viewing range in which a high contrast of 30 or more can be obtained. As shown in FIG. 7, the transmissive-display viewing range takes the maximum value adjacent to Wt/Rt of 0.58.

Figure 11:
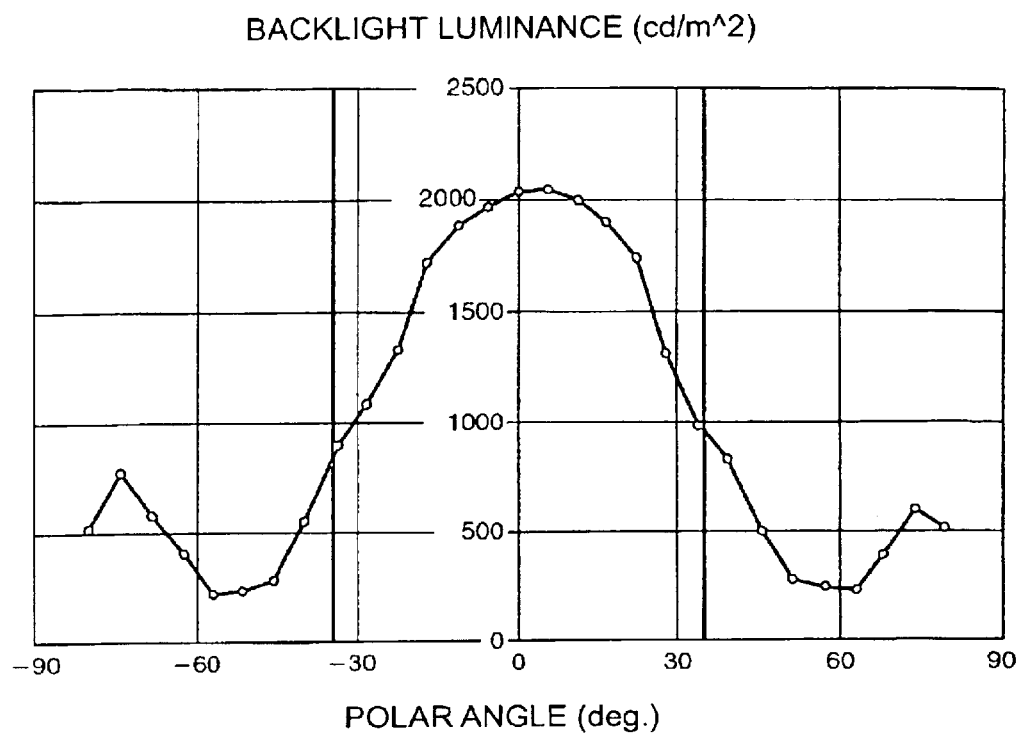
FIG. 11 is a graph showing the relationship between the luminance of a backlight and the polar angle.

FIG. 11 is a graph showing the relationship between the backlight luminance and the polar angle in popular liquid crystal display devices in portable telephones and the like. When the polar angle is 0°, that is, when a display surface of a liquid crystal display device is viewed from the vertical direction, the backlight luminance is the highest. A high backlight luminance (approximately 1000 cd/m² or more) is obtained when the polar angle is within the range of ±35°. On the other hand, in FIG. 7, a transmissive-display viewing range of 35° or more is obtained when $0.5 \leq W1/Rt \leq 0.75$. Accordingly, high contrast can be ensured above the range of the high backlight luminance in the transmissive display region by setting the retardation films so that $0.5 \leq W1/Rt \leq 0.75$.

FIG. 10 shows the relationship between W4/Rr and a reflective-display viewing range. FIG. 10 shows a case in which the retardation Rr in the reflective display region is 200 nm. The total retardation W4 in the Z-axis direction is the sum of the retardation ($nx1-nz1$)×d1 in the Z-axis direction of the first retardation film 104, and the retardation (($nx2+ny2$)/2−$nz2$)×d2 in the Z-axis direction of the second retardation film 103. The transmissive-display viewing range means a viewing range in which a high contrast of 10 or more can be obtained. In a known STN-mode liquid crystal display device, the viewing range is approximately 30°. On the other hand, in FIG. 10, a transmissive-display viewing range of 30° or more is obtained when $0.5 \leq W4/Rr \leq 0.75$. Accordingly, high contrast can be ensured above the range of the viewing range of the known STN-mode liquid crystal display device in the reflective display region by setting the retardation films so that $0.5 \leq W4/Rr \leq 0.75$.

The retardation films 103 and 115 may be broadband quarter-wave plates each formed by appropriately combining a half-wave plate and a quarter-wave plate. Preferably, in the retardation films 103 and 115, the ratio R(450)/R(590) of the retardation R(450) in the XY plane at 450 nm and the retardation R(590) in the XY plane at 590 nm is less than 1. This makes it possible to produce substantially circularly polarized light in the visible region.

As described above, the liquid crystal display device of the first embodiment can achieve a high-contrast display with a wide viewing angle.

Figure 2:
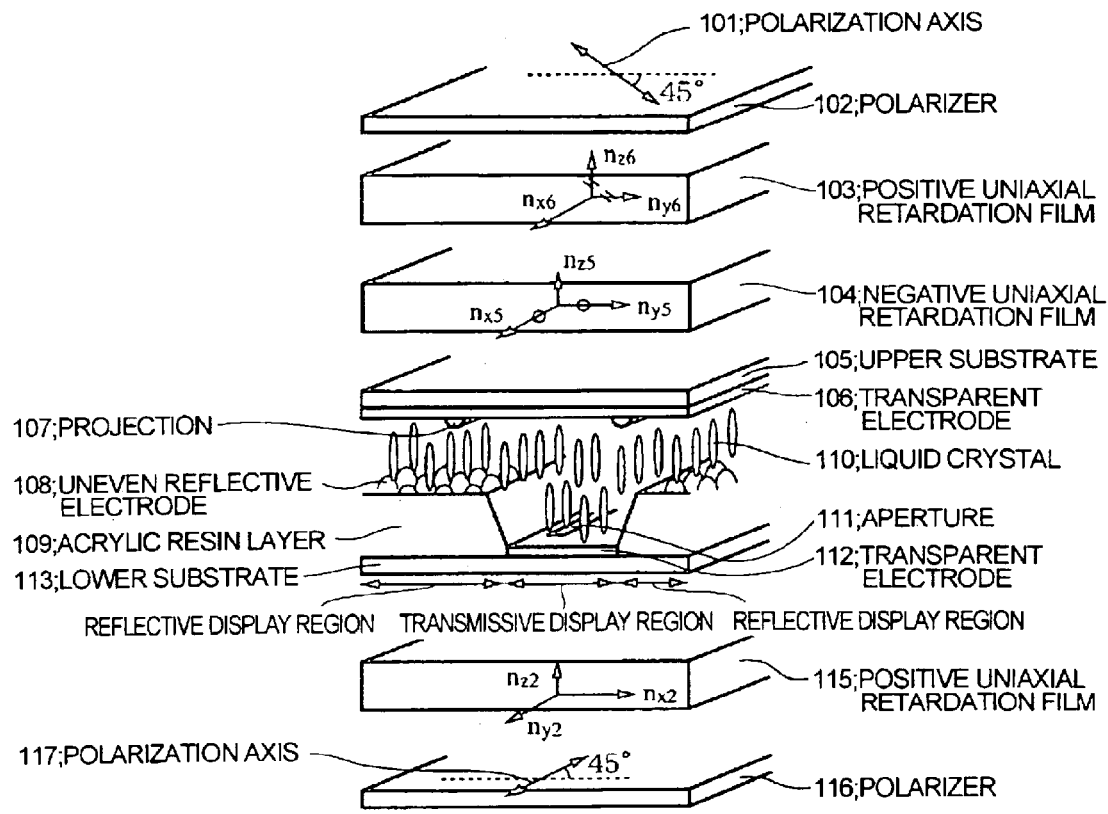
FIG. 2 is a schematic view showing a partial cross-sectional configuration of a liquid crystal display device according to a second embodiment of the present invention.

A second embodiment of the present invention will be described below with reference to FIG. 2. The same reference numerals as those in the first embodiment shown in FIG. 1 denote similar structures, unless otherwise specified, and descriptions thereof are omitted.

In order to perform reflective display, light incident from the outside of the device is used, and the incident light is guided to a liquid crystal layer 110 through a polarizer 102, retardation films 103 and 104, an upper substrate 105, and an electrode 106. In a reflective display region, the incident light passes through the liquid crystal layer 110, and is then reflected by a reflective electrode 108. The reflected light passes through the liquid crystal layer 110 again, is returned to the outside of the device through the electrode 106, the upper substrate 105, the retardation films 104 and 103, and the polarizer 102, and reaches a viewer, thereby performing reflective display. In such reflective display, the polarization state of light passing through the liquid crystal layer 110 can be changed to perform light and dark displays by controlling the alignment of liquid crystal in the liquid crystal layer 110 by the electrodes 106 and 112.

In order to perform transmissive display, light emitted from a backlight (illuminationdevice) enters through a polarizer 116, a retardation film 115, and a substrate 113. In this case, in a transmissive display region, light incident from the substrate 113 passes through an electrode 112, the liquid crystal layer 110, the electrode 106, the substrate 105, the retardation films 104 and 103, and the polarizer 102 in that order to perform transmissive display. In such transmissive display, the polarization state of light passing through the liquid crystal layer 110 can also be changed to perform light and dark displays by controlling the alignment of liquid crystal in the liquid crystal layer 110 by the electrodes 106 and 112.

In the reflective display mode of these display modes, incident light passes through the liquid crystal layer 110 twice. In the transmissive display mode, light emitted from the backlight (illumination device) passes through the liquid crystal layer 110 only once. The retardation of the liquid crystal layer 110 will now be considered. In a case in which alignment control is exerted by applying the same voltage from the electrodes in a reflective display mode and a transmissive display mode, the retardation of liquid crystal differs, and the transmittance of liquid crystal is thereby changed. However, in this embodiment, a liquid-crystal-layer thickness control layer 109 made of acrylic resin is provided in a region where reflective display is performed, that is, in the reflective display region having the reflective electrode 108 shown in FIG. 2. Therefore, the thickness of the liquid crystal layer 110 is larger in the transmissive display region where transmissive display is performed than in the reflective display region, and the states of the liquid crystal layer 110 concerning the transmissive display and the reflective display in the reflective display region and the transmissive display region, that is, the distances by which light passes through the liquid crystal layer 110 in the regions can be optimized. Consequently, the liquid-crystal-layer thickness control layer 109 made of acrylic resin allows the retardation to be optimized in the reflective display region and the transmissive display region, and permits bright and high-contrast reflective display and transmissive display.

The retardation film 103 exhibits a positive uniaxiality ($nx2>ny2 \approx nz2$), and the retardation thereof in the XY plane is approximately 140 nm. The X-axis of the retardation film 103 is at an angle of approximately 45° to a polarization axis 101 of the polarizer 102. The retardation film 115 exhibits a positive uniaxiality ($nx4>ny4 \approx nz4$), and the retardation thereof in the XY plane is approximately 140 nm. The X-axis of the retardation film 115 is at an angle of approximately 45° to a polarization axis 117 of the polarizer 116. The polarization axis 101 of the polarizer 102 and the polarization axis 117 of the polarizer 116 are orthogonal to each other, and the X-axis of the retardation film 103 and the X-axis of the retardation film 115 are similarly orthogonal to each other. Since a phase difference between the polarizers 102 and 116 can be made zero during non-driving time by setting the retardation of the retardation film 103 equal to the retardation of the retardation film 115, an ideal black display can be achieved.

The retardation film 104 exhibits a negative uniaxiality ($nx1 \approx ny1 > nz1$), and has a retardation of approximately 0 in the XY plane and a retardation of approximately 220 nm in the Z-axis direction. The liquid crystal layer 110 provides a retardation of 380 nm in the transmissive display region. By placing the retardation film 104, a phase difference of the liquid crystal layer 110 produced when viewed from the oblique direction can be compensated for.

FIG. 8 shows the relationship between W2/Rt and the transmissive-display viewing range. FIG. 8 shows a case in which the retardation Rt in the transmissive display region is 400 nm. The total retardation W2 in the Z-axis direction is the sum of the retardation $(nx1-nz1) \times d1$ of the first retardation film 104, the retardation $((nx2+ny2)/2-nz2) \times d2$ of the second retardation film 103, and the retardation $((nx4+ny4)/2-nz4) \times d4$ of the fourth retardation film 115. The transmissive-display viewing range means a viewing range in which a high contrast of 30 or more can be obtained. As shown in FIG. 11, a high backlight luminance (approximately 1000 cd/m² or more) is obtained when the polar angle is within the range of ±35°. On the other hand, as shown in FIG. 8, a transmissive-display viewing range of 35° or more is obtained when $0.5 \leq W2/Rt \leq 0.75$. Accordingly, high contrast can be ensured above the range of the high backlight luminance in the transmissive display region by setting the retardation films so that $0.5 \leq W2/Rt \leq 0.75$.

As described above, the liquid crystal display device of the second embodiment can achieve a high-contrast display with a wide viewing angle.

Figure 3:
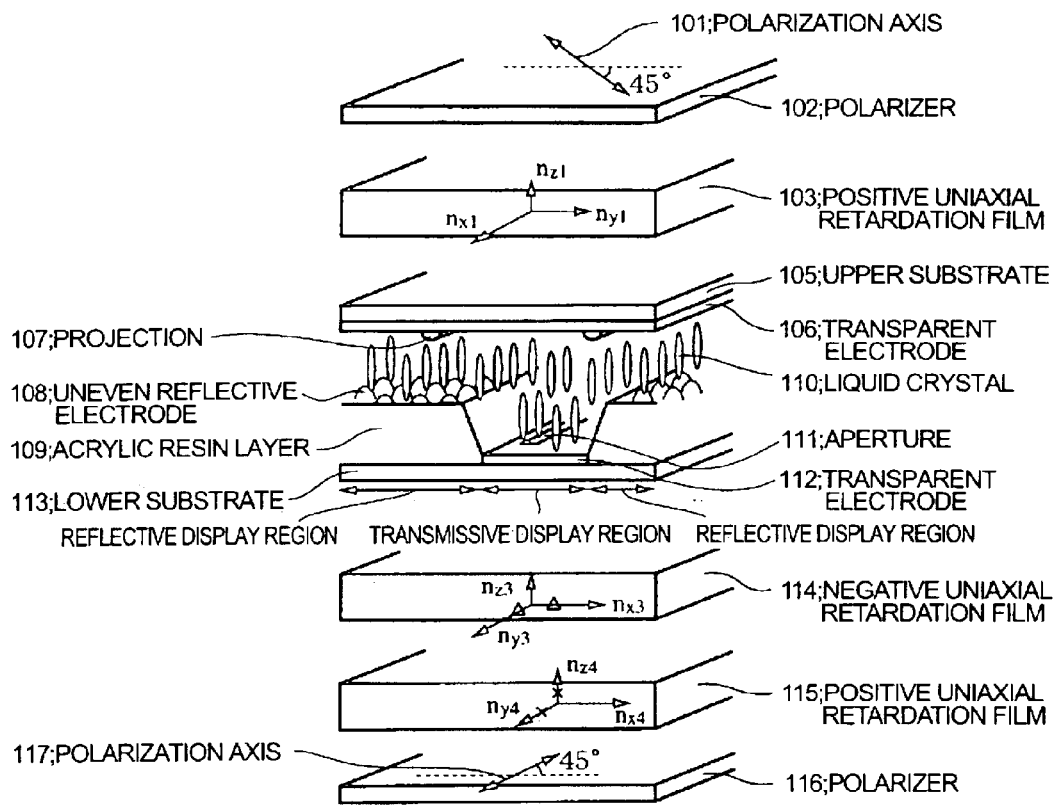
FIG. 3 is a schematic view showing a partial cross-sectional configuration of a liquid crystal display device according to a third embodiment of the present invention.

A third embodiment of the present invention will be described below with reference to FIG. 3. The same reference numerals as those in the first embodiment shown in FIG. 1 denote similar structures, unless otherwise specified, and descriptions thereof are omitted.

In order to perform reflective display, light incident from the outside of the device is used, and the incident light is guided to a liquid crystal laser 110 through a polarizer 102, a retardation film 103, an upper substrate 105, and an electrode 106. In a reflective display region, the incident light passes through the liquid crystal layer 110, and is then reflected by a reflective electrode 108. The reflected light passes through the liquid crystal layer 110 again, is returned to the outside of the device through the electrode 106, the upper substrate 105, the retardation film 103, and the polarizer 102, and reaches a viewer, thereby performing reflective display. In such reflective display, the polarization state of light passing through the liquid crystal layer 110 can also be changed to perform light and dark displays by controlling the alignment of liquid crystal in the liquid crystal layer 110 by the electrodes 106 and 108.

In order to perform transmissive display, light emitted from a backlight (illumination device) enters through a polarizer 116, retardation films 115 and 114, and a substrate 113. In this case, in a transmissive display region, the light incident from the substrate 113 passes through an electrode 112, the liquid crystal layer 110, the electrode 106, the substrate 105, the retardation film 103, and the polarizer 102 in that order to perform transmissive display. In such transmissive display, the polarization state of light passing through the liquid crystal layer 110 can also be changed to perform light and dark displays by controlling the alignment of liquid crystal in the liquid crystal layer 110 by the electrodes 106 and 112.

In the reflective display mode of these display modes, incident light passes through the liquid crystal layer 110 twice. In the transmissive display mode, light emitted from the backlight (illumination device) passes through the liquid crystal layer 110 only once. The retardation of the liquid crystal layer 110 will now be considered. In a case in which alignment control is exerted by applying the same voltage from the electrodes in a reflective display mode and a transmissive display mode, the retardation of liquid crystal differs, and the transmittance of liquid crystal is thereby changed. However, in this embodiment, a liquid-crystal-layer thickness control layer 109 made of acrylic resin is provided in a region where reflective display is performed, that is, in the reflective display region having the reflective electrode 108 shown in FIG. 3. Therefore, the thickness of the liquid crystal layer 110 is larger in the transmissive display region where transmissive display is performed than in the reflective display region, and the states of the liquid crystal layer 110 concerning the transmissive display and the reflective display in the reflective display region and the transmissive display region, that is, the distances by which light passes through the liquid crystal layer 110 in the regions can be optimized. Consequently, the liquid-crystal-layer thickness control layer 109 made of acrylic resin allows the retardation to be optimized in the reflective display region and the transmissive display region, and permits bright and high-contrast reflective display and transmissive display.

The retardation film 103 exhibits a positive uniaxiality (nx2>ny2≈nz2), and the retardation thereof in the XY plane is approximately 140 nm. The X-axis of the retardation film 103 is at an angle of approximately 45° to a polarization axis 101 of the polarizer 102. The retardation film 115 exhibits a positive uniaxiality (nx4>ny4≈nz4), and the retardation thereof in the XY plane is approximately 140 nm. The X-axis of the retardation film 115 is at an angle of approximately 45° to a polarization axis 117 of the polarizer 116. The polarization axis 101 of the polarizer 102 and the polarization axis 117 of the polarizer 116 are orthogonal to each other, and the X-axis of the retardation film 103 and the X-axis of the retardation film 115 are similarly orthogonal to each other. Since the phase difference between the polarizers 102 and 116 can be made zero during non-driving time by setting the retardation of the retardation film 103 equal to the retardation of the retardation film 115, an ideal black display can be achieved.

The retardation film 114 exhibits a negative uniaxiality (nx3≈ny1>nz3), and has a retardation of approximately 0 in the XY plane and a retardation of approximately 240 nm in the Z-axis direction. The liquid crystal layer 110 provides a retardation of 380 nm in the transmissive display region. By placing the retardation film 114, a phase difference of the liquid crystal layer 110 produced when viewed from the oblique direction can be compensated for.

FIG. 9 shows the relationship between W3/Rt and the transmissive-display viewing range. FIG. 9 shows a case in which the retardation Rt in the transmissive display region is 380 nm. The total retardation W3 in the Z-axis direction is the sum of the retardation (nx3−nz3)×d3 of the third retardation film 114, the retardation ((nx2+ny2)/2−nz2)×d2 of the second retardation film 103, and the retardation ((nx4+ny4)/2−nz4)×d4 of the fourth retardation film 115. The transmissive-display viewing range means a viewing range in which a high contrast of 30 or more can be obtained. As shown in FIG. 11, a high backlight luminance (approximately 1000 cd/m² or more) is obtained when the polar angle is within the range of ±35°. On the other hand, as shown in FIG. 9, a transmissive-display viewing range of 35° or more is obtained when $0.5 \leq W3/Rt \leq 0.75$. Accordingly, high contrast can be ensured above the range of the high backlight luminance in the transmissive display region by setting the retardation films so that $0.5 \leq W3/Rt \leq 0.75$.

As described above, the liquid crystal display device of the third embodiment can achieve a high-contrast display with a wide viewing angle.

Examples of electronic devices equipped with the liquid crystal display devices of the above embodiments will be described.

Figure 4:
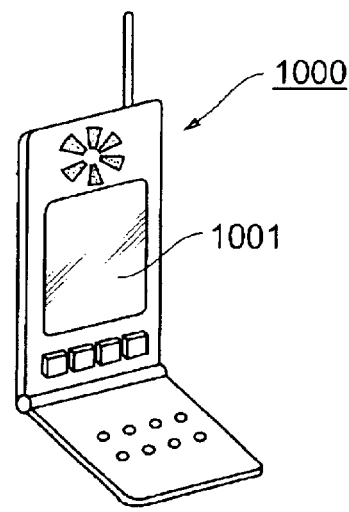
FIG. 4 is a perspective view of an example of an electronic device according to the present invention.

FIG. 4 is a perspective view showing an example of a portable telephone. In FIG. 4, reference numerals 1000 and 1001 denote a main body of the portable telephone, and a liquid crystal display using the liquid crystal display devices of the above-described first to third embodiments.

Figure 5:
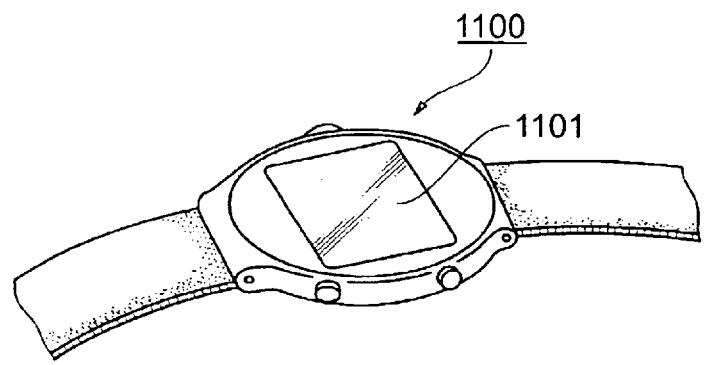
FIG. 5 is a perspective view of another example of an electronic device according to the present invention.

FIG. 5 is a perspective view showing an example of a wristwatch-type electronic device. In FIG. 5, reference numerals 1100 and 1101 denote a main body of the wristwatch, and a liquid crystal display using the liquid crystal display devices of the above-described first to third embodiments.

Figure 6:
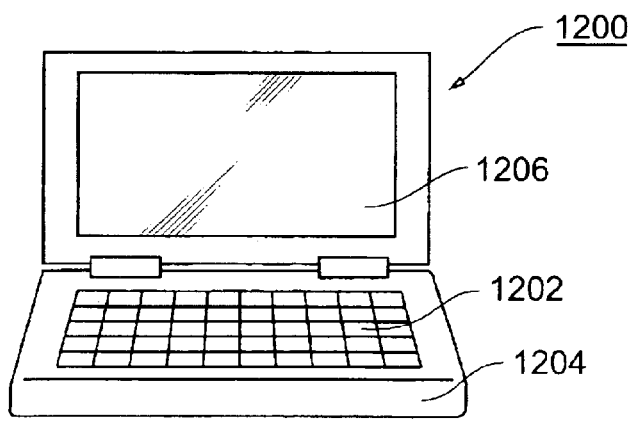
FIG. 6 is a perspective view of a further example of an electronic device according to the present invention.

FIG. 6 is a perspective view showing an example of a portable information processor, such as a word processor or a personal computer. In FIG. 6, reference numerals 1200, 1202, 1204, and 1206 respectively denote an information processor, an input section such as a keyboard, a main body of the information processor, and a liquid crystal display using the liquid crystal display devices of the above-described first to third embodiments.

Since the electronic devices shown in FIGS. 4 to 6 have a liquid crystal display using the liquid crystal display devices of the above-described first to third embodiments, they can provide a wide viewing angle and high contrast in various environments.

As described in detail above, according to the present invention, it is possible to achieve high-contrast reflective and transmissive display with a wide viewing angle in a transflective liquid crystal display device having both reflective and transmissive structures.

What is claimed is:

1. A liquid crystal display device, comprising:
   a liquid crystal layer that is held between a first substrate and a second substrate, in which each of dots contains a reflective display region for reflective display and a transmissive display region for transmissive display, the liquid crystal layer being composed of a nematic liquid crystal having a negative dielectric anisotropy;
   a first retardation film having an optically negative uniaxiality, a second retardation film having an optically positive uniaxiality, and a first polarizer that are arranged in that order outside the first substrate; and
   a third retardation film having an optically negative uniaxiality, a fourth retardation film having an optically positive uniaxiality, a second polarizer, and an illumination device that are arranged in that order outside the second substrate.

2. A liquid crystal display device, comprising:
   a liquid crystal layer that is held between a first substrate and a second substrate, in which each of dots contains a reflective display region for reflective display and a transmissive display region for transmissivedisplay, the liquid crystal layer being composed of a nematic liquid crystal aligned having a negative dielectric anisotropy;
   a first retardation film having an optically negative uniaxiality, a second retardation film having an optically positive uniaxiality, and a first polarizer that are arranged in that order outside the first substrate; and
   a fourth retardation film having an optically positive uniaxiality, a second polarizer, and an illumination device-that are arranged in that order outside the second substrate.

3. A liquid crystal display device, comprising:
a liquid crystal layer that is held between a first substrate and a second substrate, in which each of dots contains a reflective display region for reflective display and a transmissive display region for transmissivedisplay, the liquid crystal layer being composed of a nematic liquid crystal having a negative dielectric anisotropy;
a second retardation film having an optically positive uniaxiality, and a first polarizer that are arranged in that order outside the first substrate; and
a third retardation film having an optically negative uniaxiality, a fourth retardation film having an optically positive uniaxiality, a second polarizer, and an illumination device that are arranged in that order outside the second substrate.

4. A liquid crystal display device according to claim 1, the thickness of the liquid crystal layer being smaller in the reflective display region than in the transmissive display region.

5. A liquid crystal display device according to claim 1, wherein, when nz1 and nz3 represent the refractive indices of the first retardation film and the third retardation film in a Z-axis direction serving as a thickness direction, nx1 and nx3 represent the refractive indices thereof in an X-axis direction serving as one direction in a plane perpendicular to the Z-axis direction, ny1 and ny3 represent the refractive indices thereof in a Y-axis direction perpendicular to the Z-axis and X-axis directions, and d1 and d3 represent a thicknesses thereof in the Z-axis direction, nx1≈ny1>nz1 and nx3≈ny3>nz3; and wherein a sum W1 of the retardation (nx1−nz1)×d1 of the first retardation film and the retardation (nx3−nz3)×d3 of the third retardation film has the following relationship with a retardation Rt of the liquid crystal layer in the transmissive display region:

$$0.5 \times Rt \leq W1 \leq 0.75 \times Rt.$$

6. A liquid crystal display device according to claim 1, wherein, when nz1 and nz3 represent refractive indices of the first retardation film and the third retardation film in a Z-axis direction serving as a thickness direction, nx1 and nx3 represent the refractive indices thereof in an X-axis direction serving as one direction in a plane perpendicular to the Z-axis, ny1 and ny3 represent the refractive indices thereof in a direction of a Y-axis perpendicular to the Z-axis and X-axis directions, and d1 and d3 represent a thicknesses thereof in the Z-axis direction, nx1≈ny1>nz1 and nx3≈ny3>nz3;
wherein, when nz2 and nz4 represent refractive indices of the second retardation film and the fourth retardation film in the Z-axis direction serving as the thickness direction, nx2 and nx4 represent a refractive indices thereof in the X-axis direction serving as one direction in a plane perpendicular to the Z-axis, ny2 and ny4 represent refractive indices thereof in the Y-axis direction perpendicular to the Z-axis and X-axis directions, and d2 and d4 represent the thicknesses thereof in the Z-axis direction, nx2>ny2≈nz2 and nx4>ny4≈nz4; and
wherein a sum W1 of the retardation (nx1−nz1)×d1 of the first retardation film, the retardation (nx3−nz3)×d3 of the third retardation film, the retardation ((nx2+ny2)/2−nz2)×d2 of the second retardation film in the XY plane and in the Z-axis direction, and the retardation ((nx4+ny4)/2−nz4)×d4 of the fourth retardation film in the XY plane and in the Z-axis direction has the following relationship with a retardation Rt of the liquid crystal layer in the transmissive display region:

$$0.5 \times Rt \leq W1 \leq 0.75 \times Rt.$$

7. A liquid crystal display device according to claim 2, wherein, when nz1 represents a refractive index of the first retardation film in Z-axis direction serving as a thickness direction, nx1 represents the refractive index thereof in an X-axis direction serving as one direction in a plane perpendicular to the Z-axis, ny1 represents the refractive index thereof in the Y-axis direction perpendicular to the Z-axis and X-axis directions, and d1 represents a thickness thereof in the Z-axis direction, nx1≈ny1>nz1; and wherein the retardation (nx1−nz1)×d1 of the first retardation film has the following relationship with a retardation Rt of the liquid crystal layer in the transmissive display region:

$$0.5 \times Rt \leq (nx1-nz1) \times d1 \leq 0.75 \times Rt.$$

8. A liquid crystal display device according to claim 2, wherein, when nz1 represents a refractive index of the first retardation film in a Z-axis direction serving as a thickness direction, nx1 represents the refractive index thereof in an X-axis direction serving as one direction in a plane perpendicular to the Z-axis, ny1 represents the refractive index thereof in the Y-axis direction perpendicular to the Z-axis and X-axis directions, and d1 represents a thickness thereof in the Z-axis direction, nx1≈ny1>nz1;
wherein, when nz2 and nz4 represent refractive indices of the second retardation film and the fourth retardation film in the Z-axis direction serving as the thickness direction, nx2 and nx4 represent the refractive indices thereof in the X-axis direction serving as one direction in a plane perpendicular to the Z-axis direction, ny2 and ny4 represent the refractive indices thereof in the Y-axis direction perpendicular to the Z-axis and X-axis directions, and d2 and d4 represent the thicknesses thereof in the Z-axis direction, nx2>ny2≈nz2 and nx4>ny4≈nz4; and
wherein a sum W2 of the retardation (nx1−nz1)×d1 of the first retardation film, the retardation ((nx2+ny2)/2−nz2)×d2 of the second retardation film in the XY plane and in the Z-axis direction, and the retardation ((nx4+ny4)/2−nz4)×d4 of the fourth retardation film in the XY plane and in the Z-axis direction has the following relationship with a retardation Rt of the liquid crystal layer in the transmissive display region:

$$0.5 \times Rt \leq W2 \leq 0.75 \times Rt.$$

9. A liquid crystal display device according to claim 3, wherein, when nz3 represents a refractive index of the third retardation film in a Z-axis direction serving as the thickness direction, nx3 represents a refractive index thereof in an X-axis direction serving as one direction in a plane perpendicular to the Z-axis direction, ny3 represents the refractive index thereof in the Y-axis direction perpendicular to the Z-axis and X-axis directions, and d3 represents the thickness thereof in the Z-axis direction, nx3≈ny3>nz3; and wherein retardation (nx3−nz3)×d3 of the third retardation film has the following relationship with a retardation Rt of the liquid crystal layer in the transmissive display region:

$$0.5 \times Rt \leq (nx3-nz3) \times d3 \leq 0.75 \times Rt.$$

10. A liquid crystal display device according to claim 3, wherein, when nz3 represents the refractive index of the third retardation film in a Z-axis direction serving as a thickness direction, nx3 represents the refractive index thereof in an X-axis direction serving as one direction in a plane perpendicular to the Z-axis direction, ny3 represents a refractive index thereof in a Y-axis direction perpendicular to the Z-axis and X-axis directions, and d3 represents a thickness thereof in the Z-axis direction, nx3≈ny3>nz3;

wherein, when nz2 and nz4 represent refractive indices of the second retardation film and the fourth retardation film in the Z-axis direction serving as the thickness direction, nx2 and nx4 represent refractive indices thereof in the X-axis direction serving as one direction in a plane perpendicular to the Z-axis direction, ny2 and ny4 represent refractive indices thereof in the Y-axis direction perpendicular to the Z-axis and X-axis directions, and d2 and d4 represent the thicknesses thereof in the Z-axis direction, nx2>ny2≈nz2 and nx4>ny4≈nz4; and wherein a sum W3 of the retardation $(nx3-nz3) \times d3$ of the third retardation film, the retardation $((nx2+ny2)/2-nz2) \times d2$ of the second retardation film in the XY plane and in the Z-axis direction, and the retardation $((nx4+ny4)/2-nz4) \times d4$ of the fourth retardation film in the XY plane and in the Z-axis direction has the following relationship with a retardation Rt of the liquid crystal layer in the transmissive display region:

$$0.5 \times Rt \leq W3 \leq 0.75 \times Rt.$$

11. A liquid crystal display device according to claim 1, wherein, when nx2 and nx4 represent refractive indices of the second retardation film and the fourth retardation film in the X-axis direction serving as one direction in a plane perpendicular to the Z-axis direction serving as the thickness direction, ny2 and ny4 represent a refractive indices thereof in the Y-axis direction perpendicular to the Z-axis and X-axis directions, and d2 and d4 represent thicknesses thereof in the Z-axis direction, the X-axis of the second retardation film and the X-axis of the fourth retardation film are orthogonal to each other, and the following condition is satisfied:

$$(nx2-ny2) \times d2 = (nx4-ny4) \times d4.$$

12. A liquid crystal display device according to claim 11, the second retardation film and the fourth retardation film satisfying the following condition:

$$100 \text{ nm} \leq (nx2-ny2) \times d2 = (nx4-ny4) \times d4 \leq 160 \text{ nm}.$$

13. A liquid crystal display device according to claim 1, the second retardation film being composed of two or more oriented films that convert linearly polarized light incident from the first polarizer into circularly polarized light in a broad band, and the fourth retardation film being composed of two or more oriented films that convert linearly polarized light incident from the second polarizer into circularly polarized light in a broad band.

14. A liquid crystal display device according to claim 1, the second retardation film being composed of two or more oriented films that convert linearly polarized light incident from the first polarizer into circularly polarized light in a broad band.

15. A liquid crystal display device according to claim 1, the fourth retardation film being composed of two or more oriented films that convert linearly polarized light incident from the second polarizer into circularly polarized light in a broad band.

16. A liquid crystal display device according to claim 1, the ratio R(450)/R(590) of an in-plane retardation R(450) for 450 nm and an in-plane retardation R(590) for 590 nm being less than 1 in the second retardation film and the fourth retardation film.

17. A liquid crystal display device according to claim 1, the polarization axis of the first polarizer and the polarization axis of the second polarizer being orthogonal to each other.

18. A liquid crystal display device according to claim 1, the retardation $(nx1-nz1) \times d1$ of the first retardation film being substantially equal to the retardation $(nx3-nz3) \times d3$ of the third retardation film.

19. A liquid crystal display device according to claim 1, wherein, when nz1 represents the refractive index of the first retardation film in a Z-axis direction serving as a thickness direction, nx1 represents the refractive index thereof in an X-axis direction serving as one direction in a plane perpendicular to the Z-axis direction, ny1 represents a refractive index thereof in a Y-axis direction perpendicular to the Z-axis and X-axis directions, and d1 represents a thickness thereof in the Z-axis direction, nx1≈ny1>nz1; and wherein the retardation $(nx1-nz1) \times d1$ of the first retardation film has the following relationship with a retardation Rr of the liquid crystal layer in the reflective display region:

$$0.5 \times Rr \leq (nx1-nz1) \times d1 \leq 0.75 \times Rr.$$

20. A liquid crystal display device according to claim 1, wherein, when nz1 represents a refractive index of the first retardation film in a Z-axis direction serving as a thickness direction, nx1 represents a refractive index thereof in an X-axis direction serving as one direction in a plane perpendicular to the Z-axis direction, ny1 represents a refractive index thereof in a Y-axis direction perpendicular to the Z-axis and X-axis directions, and d1 represents a thickness thereof in the Z-axis direction, nx1≈ny1>nz1;

wherein, when nz2 represents a refractive index of the second retardation film in the Z-axis direction serving as the thickness direction, nx2 represents the refractive index thereof in the X-axis direction serving as one direction in a plane perpendicular to the Z-axis direction, ny2 represents the refractive index thereof in the Y-axis direction perpendicular to the Z-axis and X-axis directions, and d2 represents the thickness thereof in the Z-axis direction, nx2>ny2≈nz2; and wherein a sum W4 of the retardation $(nx1-nz1) \times d1$ of the first retardation film, and the retardation $((nx2+ny2)/2-nz2) \times d2$ of the second retardation film in the XY plane and in the Z-axis direction has the following relationship with a retardation Rr of the liquid crystal layer in the reflective display region:

$$0.5 \times Rr \leq W4 \leq 0.75 \times Rr.$$

21. A liquid crystal display device according to claim 1, a reflective layer being provided in the reflective display region to reflect incident light.

22. A liquid crystal display device according to claim 21, the reflective layer being uneven to scatter and reflect incident light.

23. A liquid crystal display device according to claim 1, the X-axis directions of the second retardation film and the fourth retardation film being orthogonal to each other, and the X-axis directions of the second retardation film and the fourth retardation film form an angle of approximately 45°, respectively, with the polarization axis of the first polarizer and the polarization axis of the second polarizer.

24. A liquid crystal display device according to claim 1, an electrode having an aperture being provided on an inner surface, adjacent to the liquid crystal layer, of at least one of the first substrate and the second substrate so as to drive the liquid crystal.

25. A liquid crystal display device according to claim 1, projections being provided on an electrode disposed on an inner surface of at least one of the first substrate and the second substrate adjacent to the liquid crystal layer.

26. A liquid crystal display device according to claim 24, one dot containing at least two directors of the liquid crystal when the liquid crystal is driven by the electrode.

27. An electronic device comprising the liquid crystal display device according to claim 1.

* * * * *